(12) United States Patent
Zhang (10) Patent No.: US 10,488,930 B2
(45) Date of Patent: Nov. 26, 2019

(54) DISPLAY DEVICE AND METHOD FOR PROVIDING HAPTIC FEEDBACK USING THE SAME

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Changjun Zhang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/826,423

(22) Filed: Nov. 29, 2017

(65) Prior Publication Data

US 2018/0267608 A1  Sep. 20, 2018

(30) Foreign Application Priority Data

Mar. 15, 2017 (CN) .......................... 2017 1 0153971

(51) Int. Cl.
*G06F 3/01* (2006.01)
*G06F 3/041* (2006.01)
(Continued)

(52) U.S. Cl.
CPC ............ *G06F 3/016* (2013.01); *G06F 1/1601* (2013.01); *G06F 1/325* (2013.01); *G06F 1/3262* (2013.01);
(Continued)

(58) Field of Classification Search
CPC ....... G06F 3/016; G06F 3/0412; G06F 3/0414
See application file for complete search history.

(56) References Cited

U.S. PATENT DOCUMENTS 5,760,530 A * 6/1998 Kolesar ................... H01L 27/20
310/317
2003/0216157 A1 11/2003 Wang et al.
(Continued)

FOREIGN PATENT DOCUMENTS

| CN | -102713805 | 10/2012 |
| CN | -203858612 | 10/2014 |
| CN | -104714688 | 6/2015 |

OTHER PUBLICATIONS

"First office action," CN Application No. 201710153971.3 dated Jun. 19, 2019.

*Primary Examiner* — Amare Mengistu
*Assistant Examiner* — Crystal Mathews
(74) *Attorney, Agent, or Firm* — Womble Bond Dickinson (US) LLP (57) ABSTRACT

The present disclosure relates to the field of display technologies, and provides a display device and a method for providing haptic feedbacks using the same. The display device comprises: a display assembly, wherein the display assembly comprises a display face and a non-display face opposite to the display face; a transducer; and a haptic engine. Specifically, the transducer is arranged on the non-display face of the display assembly, and configured to output a current with corresponding amplitude according to its own deformation. Furthermore, the haptic engine is electrically coupled to the transducer, and configured to generate different degrees of haptic feedbacks based on the amplitude of the current output by the transducer.

10 Claims, 4 Drawing Sheets

(51) Int. Cl.
*G06F 1/16* (2006.01)
*G06F 1/3234* (2019.01)

(52) U.S. Cl.
CPC ............ *G06F 3/041* (2013.01); *G06F 3/0412* (2013.01); *G06F 3/0414* (2013.01); *G06F 3/0416* (2013.01)

(56) References Cited

U.S. PATENT DOCUMENTS

| | | | |
|---|---|---|---|
| 2009/0146533 A1* | 6/2009 | Leskinen | G01L 1/16 310/338 |
| 2010/0328053 A1* | 12/2010 | Yeh | G06F 3/016 340/407.2 |
| 2011/0141052 A1 | 6/2011 | Bernstein et al. | |
| 2014/0253305 A1* | 9/2014 | Rosenberg | G06F 3/016 340/407.2 |
| 2014/0295150 A1* | 10/2014 | Bower | C09J 7/02 428/201 |
| 2015/0169118 A1 | 6/2015 | Lee et al. | |
| 2015/0331517 A1* | 11/2015 | Filiz | G06F 3/0414 345/173 |
| 2016/0162079 A1* | 6/2016 | Jing | G06F 3/045 345/174 |
| 2016/0313850 A1* | 10/2016 | Aubry | G06F 3/016 |
| 2016/0343326 A1* | 11/2016 | Li | G02F 1/13338 |
| 2016/0364057 A1* | 12/2016 | Chi | G06F 3/0414 |
| 2016/0377501 A1* | 12/2016 | Agarwal | G01L 25/00 73/1.15 |
| 2017/0285810 A1* | 10/2017 | Krah | G06F 3/0412 |
| 2018/0045586 A1* | 2/2018 | Kawamura | G01L 1/16 |
| 2018/0074585 A1* | 3/2018 | Levesque | G06F 3/016 |

* cited by examiner

DISPLAY DEVICE AND METHOD FOR PROVIDING HAPTIC FEEDBACK USING THE SAME

The present application claims the priority of the Chinese patent application No. 201710153971.3 filed on Mar. 15, 2017, the disclosure of which is incorporated herein by reference.

TECHNICAL FIELD

The present disclosure relates to the field of display technologies, and in particular to a display device and a method for providing haptic feedbacks using the same.

BACKGROUND ART

With the development of touch control technologies, mobile products such as cellphones and tablet computers can accomplish almost all operations simply with one touch screen.

At present, apart from planar operations allowed in a traditional touch screen, operations perpendicular to the display screen are further increased, in order to improve the user experience. In this case, the user is capable of not only obtaining a tactile sensation corresponding to his/her operation, but also accomplishing different operations based on a magnitude of the force. For example, Apple Inc. has issued a cellphone having a pressure touch function, wherein a pressure sensor and a haptic engine are introduced into the original design. In such a cellphone, when the user presses the protection glass of the cellphone, the protection glass and the display assembly will be urged to generate a subtle deformation downwards, such that a distance between the display assembly and the pressure sensor is changed. Then, such a distance is measured by means of the pressure sensor, and from the measured distance, a magnitude of the pressure caused by the user's pressing of the protection glass is estimated rapidly in real time through complicated mathematical algorithms. After that, vibration of the haptic engine is triggered so as to provide real-time haptic feedbacks to the user.

However, in the above solution, the magnitude of the pressure caused by the user's pressing of the protection glass is estimated in a spatial approach, and thus the accuracy is far from being satisfactory. It can only distinguish between peak and pop, and thereby cannot provide actual haptic feedbacks to the user. Besides, according to the above solution, the haptic engine is required to calculate a vibration speed based on the magnitude of the pressure, and the haptic engine also needs to consume certain energy to obtain the desired speed, which leads to a rise in the overall power consumption.

SUMMARY

Embodiments of the present disclosure provide a display device and a method for providing haptic feedbacks using the same, so as to eliminate or at least alleviate one or more of the technical problems or defects mentioned above.

According to an aspect of the present disclosure, a display device is provided. The display device comprises a display assembly, a transducer and a haptic engine. Specifically, the display assembly comprises a display face and a non-display face opposite to the display face. Besides, the transducer is arranged on the non-display face of the display assembly, and configured to output a current with corresponding amplitude according to its own deformation. Furthermore, the haptic engine is electrically coupled to the transducer, and configured to generate different degrees of haptic feedbacks based on the amplitude of the current output by the transducer.

Optionally, in the display device according to an embodiment of the present disclosure, the transducer comprises a plurality of sub-transducers insulated from each other, and the plurality of sub-transducers are located in a same plane parallel to the display face of the display assembly.

Further optionally, in the display device according to an embodiment of the present disclosure, the plurality of sub-transducer are further arranged in an array.

Optionally, in the display device according to an embodiment of the present disclosure, each sub-transducer comprises a first piezoelectric film layer, a first electrode located on a side of the first piezoelectric film layer adjacent to the display assembly, and a second electrode located on a side of the first piezoelectric film layer remote from the display assembly.

Besides, in a specific embodiment, the display device further comprises a plurality of first electrode leads and a plurality of second electrode leads, wherein each first electrode lead is electrically coupled to a first electrode of a sub-transducer, and each second electrode lead is electrically coupled to a second electrode of a sub-transducer.

Furthermore, as an example, in the display device provided by the above embodiment, all the first electrode leads are further electrically coupled to each other and with the haptic engine via a first conductive wire. Similarly, in the above display device, all the second electrode leads are electrically coupled to each other and with the haptic engine via a second conductive wire.

Optionally, according to an embodiment of the present disclosure, in the display device, each sub-transducer comprises a first piezoelectric film layer, a first electrode located on a side of the first piezoelectric film layer adjacent to the display assembly, and a second electrode located on a side of the first piezoelectric film layer remote from the display assembly. Furthermore, in a specific embodiment, the haptic engine further comprises a plurality of sub-haptic engines, and the plurality of sub-haptic engines corresponds to the plurality of sub-transducers respectively. Besides, the first electrode of each sub-transducer is electrically coupled to a corresponding haptic engine via a third conductive wire, and the second electrode of each sub-transducer is electrically coupled to a corresponding haptic engine via a fourth conductive wire.

Optionally, in the display device according to an embodiment of the present disclosure, the transducer is arranged on the non-display face of the display assembly, and an orthogonal projection of the transducer on the display face coincides with the display face.

Specifically, in other embodiments, the transducer further comprises a second piezoelectric film layer, a third electrode located on a side of the second piezoelectric film layer adjacent to the display assembly, and a fourth electrode located on a side of the second piezoelectric film layer remote from the display assembly.

Furthermore, in a specific example of the above embodiment, the third electrode is electrically coupled to the haptic engine via a fifth conductive wire, and meanwhile the fourth electrode is electrically coupled to the haptic engine via a sixth conductive wire.

Optionally, in the display device according to an embodiment of the present disclosure, the haptic engine comprises a motor and a control chip. Specifically, the control chip is configured to control the motor to generate a corresponding degree of haptic feedback based on the amplitude of the current output by the transducer.

Furthermore, according to other embodiments of the present disclosure, in the display device, the display assembly comprises a display panel and a touch structure integrated in the display panel.

According to another aspect of the present disclosure, a method for providing haptic feedbacks using the display device mentioned in the first aspect is provided. Specifically, the method comprises: outputting a current with corresponding amplitude by the transducer according to its own deformation; and upon receipt of the current output by the transducer, generating by the haptic engine a corresponding degree of haptic feedback based on the amplitude of the current.

Optionally, in the method according to an embodiment of the present disclosure, the step of generating by the haptic engine a corresponding degree of haptic feedback based on the amplitude of the current upon receipt of the current output by the transducer comprises a sub-step of: comparing by the haptic engine the amplitude of the received current with a preset current value, and generating haptic feedbacks if the amplitude of the received current is greater than or equal to the preset current value.

BRIEF DESCRIPTION OF THE DRAWINGS

In order to illustrate technical solutions in embodiments of the present disclosure more clearly, drawings to be used in depictions of the embodiments will be briefly introduced as follows. Apparently, the drawings in the depictions below only represent some embodiments of the present disclosure. For a person having ordinary skills in the art, other embodiments can also be obtained from these embodiments without any inventive efforts.

DETAILED DESCRIPTION OF THE EMBODIMENTS

The technical solutions in the embodiments of the present disclosure shall be described clearly and completely as follows with reference to the drawings in the embodiments of the present disclosure. Apparently, the embodiments described below are only part of the embodiments of the present disclosure, rather than all of them. Based on the embodiments in the present disclosure, all other embodiments obtainable by a person having ordinary skills in the art without any inventive efforts shall fall within the protection scope of the present disclosure.

In the following descriptions, various components will be indicated by reference signs as follows: 10—display assembly; 11—display face; 21—first piezoelectric film layer; 22—second piezoelectric film layer; 31—first electrode; 32—second electrode; 33—third electrode; 34—fourth electrode; 41—first electrode lead; 42—second electrode lead; 51—first conductive wire; 52—second conductive wire; 53—third conductive wire; 54—fourth conductive wire; 55—fifth conductive wire; 56—sixth conductive wire; 60—haptic engine; 61—motor; 62—control chip; 100—transducer; and 101—sub-transducer.

According to an embodiment of the present disclosure, a display device is provided. As shown in FIG. 1-FIG. 5, the display device comprises a display assembly 10, wherein the display assembly 10 comprises a display face 11 (i.e., an upper surface of the display assembly 10 in the drawings) and a non-display face opposite to the display face 11 (i.e., a lower surface of the display assembly 10 in the drawings). Besides, the display device further comprises a transducer 100 and a haptic engine 60. Specifically, the transducer 100 is arranged on a side of the display assembly 10 remote from the display face 11, i.e., on the non-display face of the display assembly 10, and configured to output a current with corresponding amplitude according to its own deformation. Besides, the haptic engine 60 is electrically coupled to the transducer 100, and configured to generate different degrees of haptic feedbacks based on a magnitude of the current output by the transducer 100.

It should be noticed herein that apart from the current, the transducer 100 can further output a voltage corresponding to the current.

Furthermore, in a specific embodiment, the display device can further comprise a rectifier circuit, a filter circuit and a transformer circuit. As an example, an input terminal of the rectifier circuit is electrically coupled to the transducer 100, and an output terminal thereof is electrically coupled to an input terminal of the filter circuit. Besides, the input terminal of the filter circuit is electrically coupled to the output terminal of the rectifier circuit, and an output terminal thereof is electrically coupled to an input terminal of the transformer circuit. Moreover, the input terminal of the transformer circuit is electrically coupled to the output terminal of the filter circuit, and an output terminal thereof is electrically coupled to the haptic engine 60.

In a specific example of the above embodiment, the rectifier circuit is used for converting an AC voltage and an AC current output by the transducer 100 into a DC voltage and a DC current respectively. For the filter circuit, it is used for stabilizing the DC voltage and the DC current it receives. In addition, the transformer circuit is used for converting the stabilized DC voltage into a voltage value required for the operation of the haptic engine 60.

It should be noted that in the above display device, the display assembly 10 comprises a display panel. Specifically, the display panel can be a liquid crystal display panel, or an organic light emitting diode (OLED) display panel.

If the display panel is a liquid crystal display panel, the display panel comprises an array substrate, a counter substrate and a liquid crystal layer arranged therebetween. Specifically, the array substrate can further comprise a thin film transistor (TFT for short), and a pixel electrode electrically coupled to a drain of the TFT. Furthermore, the array substrate can further comprise a common electrode. Besides, the counter substrate can comprise a black matrix and a color film layer. Specifically, the color film layer can be arranged either on the counter substrate, or on the array substrate. For the common electrode, it can be arranged either on the array substrate, or on the counter substrate. It should be pointed out herein that the display assembly 10 further comprises a backlight source, which will be easily comprehended by those skilled in the art.

If the display panel is an OLED display panel, it can comprise an array substrate and an encapsulation substrate. Specifically, the array substrate can comprise a TFT, an anode and a cathode electrically coupled to a drain of the TFT, as well as an organic material functional layer located between the anode and the cathode.

Next, how to reduce the power consumption during the provision of haptic feedbacks using the display device provided by the embodiments of the present disclosure will be introduced briefly.

Supposing the power consumption consumed by the vibration of the haptic engine 60 is W, and the mechanical energy for the user touching the display face 11 is $W_1$. In the present disclosure, by means of the transducer, the mechanical energy for the user touching the display face 11 is firstly converted into the electric energy output by the transducer 100. Supposing the energy conversion efficiency during this process is a, wherein a is smaller than or equal to 1. Furthermore, according to an embodiment of the present disclosure, by means of the haptic engine 60, the electric energy output by the transducer 100 can be further converted into the kinetic energy of the vibration of the haptic engine 60. Supposing the energy conversion efficiency during this process is b, wherein b is smaller than or equal to 1. In this case, part of the mechanical energy $W_1$ for the user touching the display face 11 will be converted into the vibration energy of the haptic engine 60. Specifically, this part of energy will be $a*b*W_1$. Thereby, as compared with a traditional solution where the vibration energy of the haptic engine 60 is completely provided by an additional energy input, which requires at least a power consumption of W, in the embodiment of the present disclosure, the vibration of the haptic engine 60 requires only a power consumption of $W_2=W-a*b*W_1$. Apparently, in the embodiment of the present disclosure, the additional power consumption required for the vibration of the haptic engine 60 is obviously smaller, i.e., $W_2=W-a*b*W_1$ is smaller than W. Therefore, the display device according to the embodiment of the present disclosure reduces the power consumption at least during the provision of the haptic feedbacks.

According to an embodiment of the present disclosure, a display device is provided. In the display device, a transducer 100 is arranged on a non-display face of a display assembly 10, and the transducer 100 is electrically coupled to a haptic engine 60. Thereby, when the user touches a display face 11, the transducer 100 deforms under the effect of force, thus outputting a current. Furthermore, the haptic engine 60 electrically coupled to the transducer 100 will receive the current output by the transducer 100, and then vibrate at different speeds based on a magnitude of the current, thus generating haptic feedbacks. As compared with a traditional solution for providing haptic feedbacks, the embodiment of the present disclosure not only provides haptic feedbacks of high accuracy to the user, but also converts the electric energy generated by the transducer 100 into the mechanical energy for use by the haptic engine 60. In this way, the power consumption is reduced and the user experience is improved.

Optionally, as shown in FIGS. 1-4, the transducer 100 comprises a plurality of sub-transducers 101 insulated from each other, and each sub-transducer 101 is located in a same plane parallel to the display face 11.

Here, gaps between the sub-transducers 101 are also very small. In this case, when the user's fingers touch the display face 11, gaps between the sub-transducers 101 can be ignored as compared with the width of the user's fingers. Therefore, the touch control function of the display device will not be subjected to adverse effects.

It should be noted that in an embodiment of the present disclosure, the plurality of sub-transducers 101 can be arranged in any suitable manner, as long as an orthogonal projection of the plurality of sub-transducers 101 on the display face 11 coincides with the display face 11.

In addition to the structure of a transducer 100 comprising a plurality of sub-transducers 101, in an embodiment of the present disclosure, regions of the sub-transducers 101 having deformations can also be compared with those having no deformation. The deformation becomes more accurate since the range of comparison is narrowed. In this way, the output current value can be more accurate, and in turn the haptic feedbacks can be more sensitive.

Furthermore, as shown in FIGS. 1-4, the plurality of sub-transducers 101 are arranged in an array.

It should be noted that the number of the sub-transducers 101 is associated with the size of the display face 11. Specifically, the larger the display face 11 is, the greater the number of the sub-transducers 101 will be.

Exemplarily, the plurality of sub-transducers 101 can be arranged in an array of 8*12.

In an embodiment of the present disclosure, the plurality of sub-transducers 101 can be arranged in an array, which makes the entire arrangement simple and easy to be manufactured.

Figure 1:
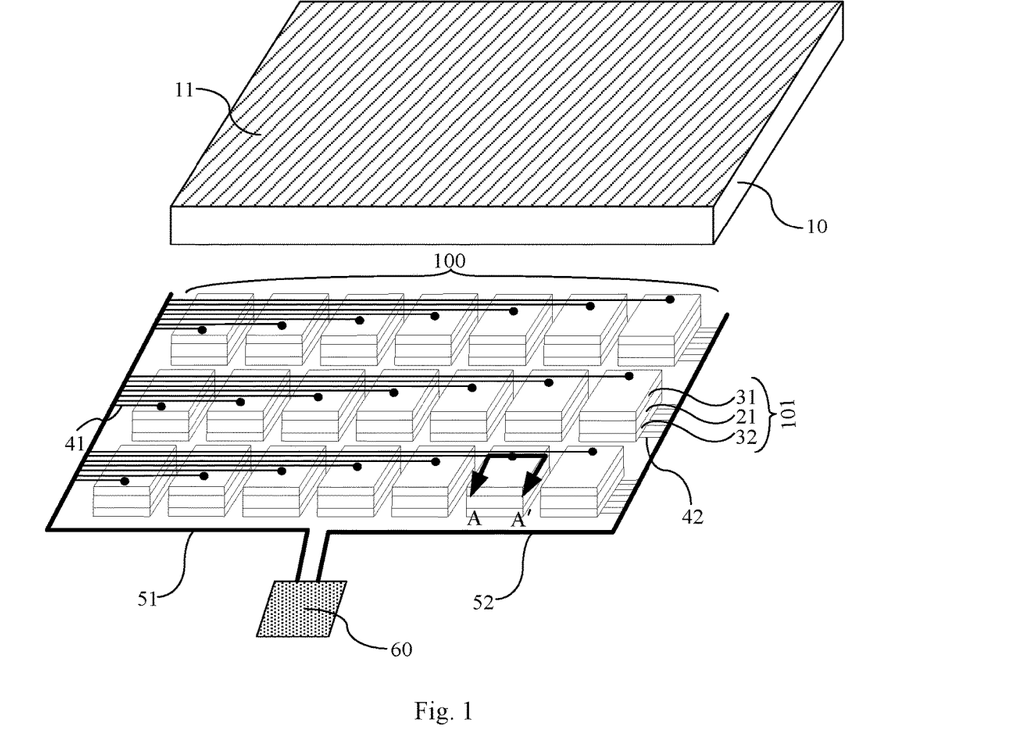
FIG. 1 is a schematic structure view for a display device according to an embodiment of the present disclosure.
Figure 2:
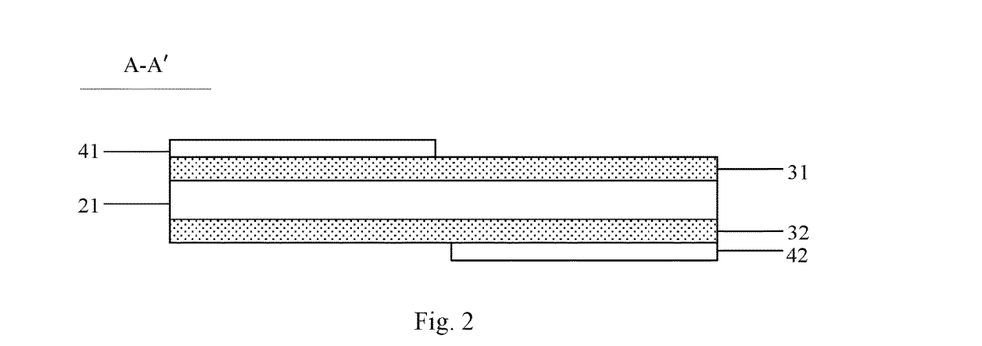
FIG. 2 is a schematic sectional view along line A-A' in FIG. 1.

Optionally, as shown in FIG. 1 and FIG. 2, each sub-transducer 101 in the plurality of sub-transducers 101 comprises a first piezoelectric film layer 21, a first electrode 31 located on a side of the first piezoelectric film layer 21 adjacent to the display assembly 10, and a second electrode 32 located on a side of the first piezoelectric film layer 21 remote from the display assembly 10.

Besides, the display device further comprises first electrode leads 41 and second electrode leads 42 corresponding to the plurality of sub-transducers 101. In this case, the first electrode lead 41 of each sub-transducer 101 is electrically coupled to the first electrode 31, and the second electrode lead 42 of each sub-transducer 101 is electrically coupled to the second electrode 32. Besides, all the first electrode leads 41 are electrically coupled to each other via a first conductive wire 51 and with the haptic engine 60 via the first conductive wire 51. Similarly, all the second electrode leads 42 are electrically coupled to each other via a second conductive wire 52 and with the haptic engine 60 via the second conductive wire 52.

Herein, for each sub-transducer 101, apart from a first electrode lead 41 and a second electrode lead 42 electrically coupled to the first electrode 31 and the second electrode 32 of the sub-transducer 101 respectively, the first electrode leads 41 and the second electrode leads 42 electrically coupled to other sub-transducers 101 may also pass through the sub-transducer 101, but they will not be electrically coupled to this sub-transducer 101. Specifically, a first electrode lead 41 electrically coupled to a specific sub-transducer 101 is offset from the first electrode leads 41 electrically coupled to other sub-transducers 101 and passing through this specific sub-transducer 101. Similarly, a second electrode lead 42 electrically coupled to a specific sub-transducer 101 is offset from the second electrode leads 42 electrically coupled to other sub-transducers 101 and passing through this specific sub-transducer 101. As an example, in FIG. 1, a black origin indicates the electric connection between a first electrode lead 41 and a corresponding first electrode 31.

It should be noted that charges carried by the first electrode 31 and the second electrode 32 have different polarities. Thereby, the first conductive wire 51 and the second conductive wire 52 are electrically coupled to a positive pole and a negative pole of the haptic engine 60 respectively.

Exemplarily, if the first electrode 31 carries positive charges and the second electrode 32 carries negative charges, the first conductive wire 51 will be electrically coupled to the positive pole of the haptic engine 60, and the second conductive wire 52 will be electrically coupled to the negative pole of the haptic engine 60. Alternatively, if the first electrode 31 carries negative charges and the second electrode 32 carries positive charges, the first conductive wire 51 will be electrically coupled to the negative pole of the haptic engine 60, and the second conductive wire 52 will be electrically coupled to the positive pole of the haptic engine 60.

It should be further pointed out that the first piezoelectric film layer 21 can be formed of any suitable material, and the present disclosure is not limited in this aspect, as long as the first piezoelectric film layer 21 can deform to generate a current under the effect of force. For example, the first piezoelectric film layer 21 can be made of piezoelectric material. Typically, the piezoelectric material has a high accuracy of identification (at a nano-level), a high efficiency of conversion (up to above 80% at present), as well as a low linearity of voltage output (lower than one thousandth). Therefore, when the piezoelectric material is subjected to the effect of force, it will generate charges with opposite signs on two surfaces perpendicular to the force's direction, thus outputting a current.

Exemplarily, when the first piezoelectric film layer 21 is made of piezoelectric material and the deformations are respectively 10 nm, 100 nm, 200 nm, 500 nm, 800 nm, 1200 nm and 1500 nm, the magnitude value of the current output by the deforming sub-transducer 101, the speed of the haptic engine 60, and the haptic feedbacks felt by the user are indicated below.

| Deformation of the transducer | Output current | Speed of the haptic engine | Tactile sensation |
| --- | --- | --- | --- |
| 10 nm | 0 mA | 0 r/s | Nothing |
| 100 nm | 2 mA | 15 r/s | Very light |
| 200 nm | 4 mA | 30 r/s | Light |
| 500 nm | 8 mA | 50 r/s | Average |
| 800 nm | 13 mA | 90 r/s | Heavy |
| 1200 nm | 19 mA | 150 r/s | Very heavy |
| 1500 nm | 24 mA | 200 r/s | Extremely heavy |

Furthermore, it should be further noted that the first electrode 31 and the second electrode 32 can be formed of one selected from a group containing metallic materials such as gold, copper-nickel alloy, aluminum and silver. Besides, the first electrode 31 and the second electrode 32 can be arranged on a surface of the first piezoelectric film layer 21 by magnetron sputtering, vacuum evaporation, screen printing or the like.

In an embodiment of the present disclosure, the plurality of sub-transducers 101 is electrically coupled to a haptic engine 60. Besides, the haptic engine 60 is arranged in a non-display region of the display device, which reduces the thickness of the display device. Moreover, it is also possible to arrange one haptic engine 60, thereby saving the manufacture cost.

Figure 3:
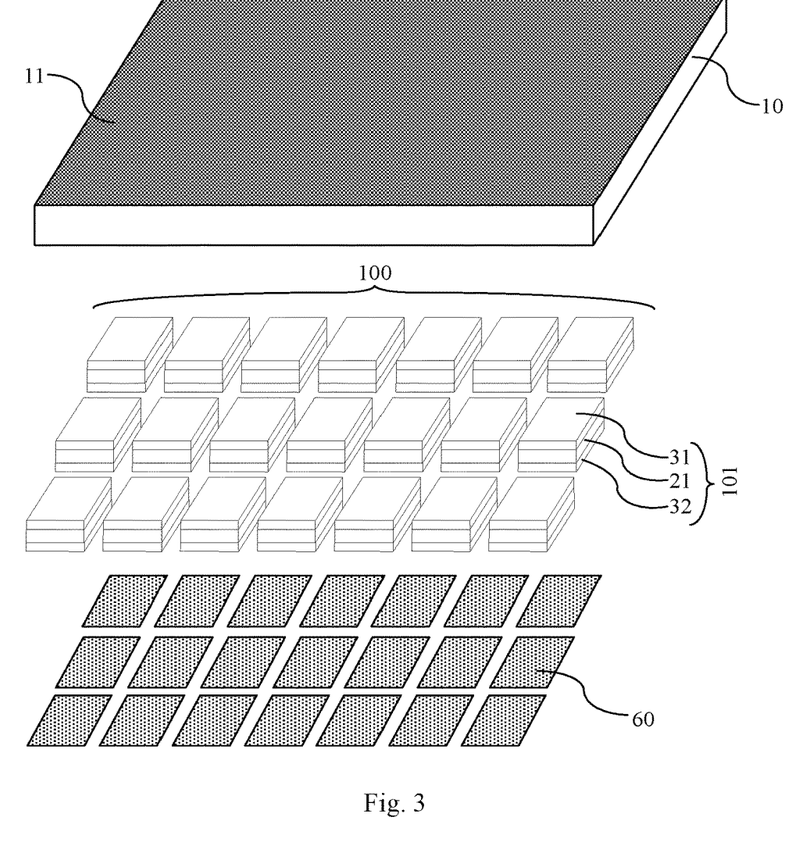
FIG. 3 is a schematic structure view for a display device according to another embodiment of the present disclosure.
Figure 4:
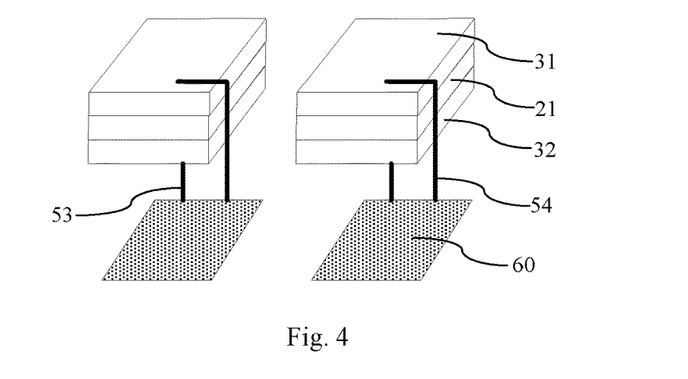
FIG. 4 is a schematic structure view for a display device according to yet another embodiment of the present disclosure.

Optionally, as shown in FIG. 3 and FIG. 4, the sub-transducer 101 comprises a first piezoelectric film layer 21, a first electrode 31 located on a side of the first piezoelectric film layer 21 adjacent to the display assembly 10, and a second electrode 32 located on a side of the first piezoelectric film layer 21 remote from the display assembly 10. The haptic engine 60 can also comprise a plurality of sub-haptic engines, and each sub-haptic engine can correspond to a sub-transducer 101. Besides, the first electrode 31 of each sub-transducer 101 is electrically coupled to a corresponding sub-haptic engine via a third conductive wire 53, and meanwhile the second electrode 32 is electrically coupled to a corresponding sub-haptic engine via a fourth conductive wire 54.

It should be noted that charges carried by the first electrode 31 and the second electrode 32 have different polarities. In addition, the third conductive wire 53 and the fourth conductive wire 54 are electrically coupled to a positive pole and a negative pole of the haptic engine 60 respectively.

Exemplarily, if the first electrode 31 carries positive charges and the second electrode 32 carries negative charges, the third conductive wire 53 will be electrically coupled to the positive pole of the haptic engine 60, and the fourth conductive wire 54 will be electrically coupled to the negative pole of the haptic engine 60. Alternatively, if the first electrode 31 carries negative charges and the second electrode 32 carries positive charges, the third conductive wire 53 will be electrically coupled to the negative pole of the haptic engine 60, and the fourth conductive wire 54 will be electrically coupled to the positive pole of the haptic engine 60.

In an embodiment of the present disclosure, the haptic engine 60 is in a one-to-one correspondence to the sub-transducers 101. When the user touches the display face 11, he/she can feel haptic feedbacks of high accuracy at a touch position, which improves the user experience. In this case, when a plurality of fingers touches the display face 11 simultaneously, each finger can feel haptic feedbacks at a corresponding touch position. Similarly, when a finger performs a continuous operation, it can feel continuous haptic feedbacks in the regions passed by. For example, during slide unlocking, continuous haptic feedbacks can be felt in an unlocked region as the finger slides.

Figure 5:
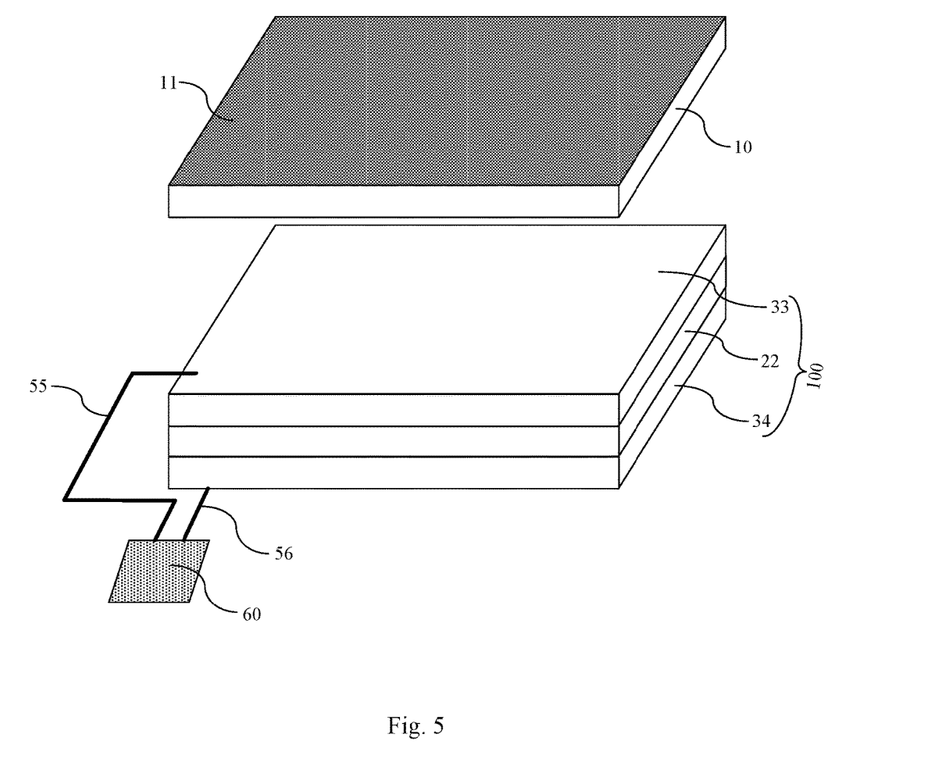
FIG. 5 is a schematic structure view for a display device according to still another embodiment of the present disclosure.

Optionally, as shown in FIG. 5, the transducer 100 is arranged on a side of the display assembly 10 remote from the display face 11, i.e., on the non-display face of the display assembly 10. Also, an orthogonal projection of the transducer 100 on the display face 11 coincides with the display face 11. Furthermore, the transducer 100 comprises a second piezoelectric film layer 22, a third electrode 33 located on a side of the second piezoelectric film layer 22 adjacent to the display assembly 10, and a fourth electrode 34 located on a side of the second piezoelectric film layer 22 remote from the display assembly 10. In the above embodiment, the third electrode 33 is electrically coupled to the haptic engine 60 via a fifth conductive wire 55, and the fourth electrode 34 is electrically coupled to the haptic engine 60 via a sixth conductive wire 56.

It should be noted that charges carried by the third electrode 33 and the fourth electrode 34 have different polarities. Thereby, the fifth conductive wire 55 and the sixth conductive wire 56 are electrically coupled to a positive pole and a negative pole of the haptic engine 60 respectively.

Exemplarily, if the third electrode 33 carries positive charges and the fourth electrode 34 carries negative charges, the fifth conductive wire 55 will be electrically coupled to the positive pole of the haptic engine 60, and the sixth conductive wire 56 will be electrically coupled to the negative pole of the haptic engine 60. Alternatively, if the third electrode 33 carries negative charges and the fourth electrode 34 carries positive charges, the fifth conductive wire 55 will be electrically coupled to the negative pole of the haptic engine 60, and the sixth conductive wire 56 will be electrically coupled to the positive pole of the haptic engine 60.

Furthermore, it should be further noted that the second piezoelectric film layer 22 can be formed of any suitable material, and the present disclosure is not limited in this aspect, as long as the second piezoelectric film layer 22 can deform to generate a current under the effect of force. For example, the second piezoelectric film layer 22 can be made of a piezoelectric material. Typically, the piezoelectric material has a high accuracy of identification (at a nano-level), a high efficiency of conversion (up to above 80% at present), and a low linearity of voltage output (lower than one thousandth). Therefore, when the piezoelectric material is subjected to the effect of force, it will generate charges with opposite signs on two surfaces perpendicular to the force's direction, thus outputting a current.

Exemplarily, when the second piezoelectric film layer 22 is made of piezoelectric material and the deformations are respectively 10 nm, 100 nm, 200 nm, 500 nm, 800 nm, 1200 nm and 1500 nm, the magnitude value of the current output by the transducer 100, the speed of the haptic engine 60, and the haptic feedbacks felt by the user are indicated below:

| Deformation of the transducer | Output current | Speed of the haptic engine | Tactile sensation |
| --- | --- | --- | --- |
| 10 nm | 0 mA | 0 r/s | Nothing |
| 100 nm | 2 mA | 15 r/s | Very light |
| 200 nm | 4 mA | 30 r/s | Light |
| 500 nm | 8 mA | 50 r/s | Average |
| 800 nm | 13 mA | 90 r/s | Heavy |
| 1200 nm | 19 mA | 150 r/s | Very heavy |
| 1500 nm | 24 mA | 200 r/s | Extremely heavy |

Besides, it should be further pointed out that the third electrode 33 and the fourth electrode 34 can be formed of one selected from a group containing metallic materials such as gold, copper-nickel alloy, aluminum and silver. Moreover, the third electrode 33 and the fourth electrode 34 can be arranged on a surface of the second piezoelectric film layer 22 by magnetron sputtering, vacuum evaporation, screen printing or the like.

In addition to the structure of a transducer 100 comprising a plurality of sub-transducers 101, in an embodiment of the present disclosure, the transducer 100 can be further arranged as a structure tiled on a surface of the display assembly 10 remote from the display face 11, wherein an orthogonal projection thereof on the display face 11 coincides with the display face 11, which makes the manufacture of the entire component easier.

Figure 6:
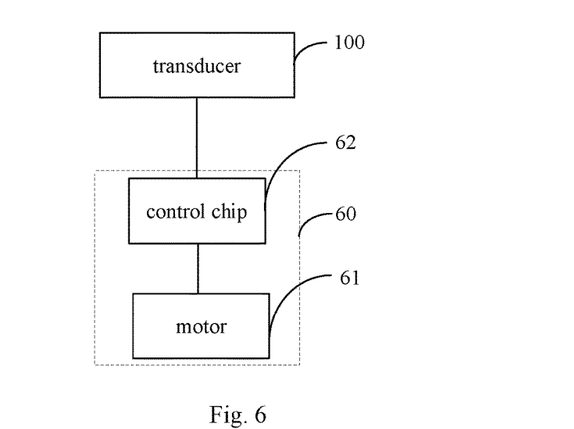
FIG. 6 is a schematic connection view for each module in the haptic engine according to an embodiment of the present disclosure.

Optionally, as shown in FIG. 6, the haptic engine 60 comprises a motor 61 and a control chip 62. Specifically, the control chip 62 is configured to control the motor 61 to generate a corresponding degree of haptic feedback based on the magnitude of the current output by the transducer 100.

The haptic engine 60 herein can be a micro vibration motor.

It should be noted that the control chip 62 can be arranged at any suitable position, as long as it can control the motor 61 to generate a corresponding haptic feedback based on the magnitude of the current output by the transducer 100. For example, the control chip 62 can be integrated in the motor 61.

In an embodiment of the present disclosure, the haptic engine 60 is a structure comprising a motor 61 and a control chip 62. This enables the control chip 62 to receive the current output by the transducer 100 and control the motor 61 to vibrate at different speeds based on the magnitude of the current, thus generating a corresponding degree of haptic feedback.

Optionally, in a specific embodiment, the display assembly 10 comprises a display panel and a touch structure integrated in the display panel.

The display device herein can further comprise a proximity sensor. In this case, when the display face 11 is contacted by a face or other objects not aiming at touch control, the proximity sensor can detect their presence and shut down the touch control function accordingly. Thereby, erroneous touch control of the display device is prevented. In this case, if the display face 11 is touched by fingers, the touch control function can be re-started.

It should be noted that the touch structure can be arranged at any suitable position, as long as it can achieve the touch control function. For example, the touch structure can be in cell touch, on cell touch or one glass solution (OGS for short).

In an embodiment of the present disclosure, a touch structure is integrated in the display panel of the display assembly 10, such that in the display device, not only the function of providing haptic feedbacks can be achieved by the transducer 100 and the haptic engine 60, but also the touch control function can be achieved by the touch structure.

Figure 7:
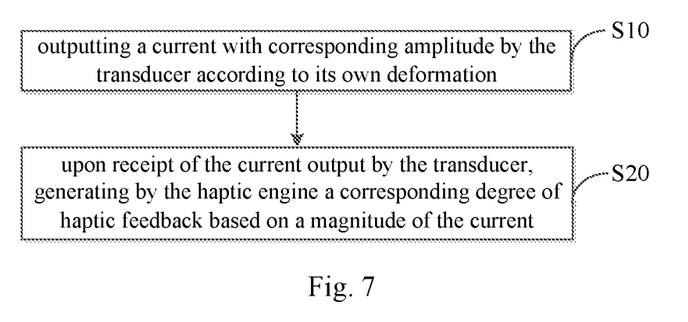
FIG. 7 is a schematic flow diagram of the method for providing haptic feedbacks using a display device according to an embodiment of the present disclosure.

According to an embodiment of the present disclosure, a method for providing haptic feedbacks using the display device described in any of the above embodiments is further provided. As shown in FIG. 7, the method can be implemented by the following steps: S10, outputting a current with corresponding amplitude by the transducer 100 according to its own deformation; and S20, upon receipt of the current output by the transducer 100, generating by the haptic engine 60 a corresponding degree of haptic feedback based on a magnitude of the current.

According to an embodiment of the present disclosure, a method for providing haptic feedbacks using a display device is further provided. According to this method, when the user touches a display face 11 of the display device, a transducer 100 will deform and output a current. Furthermore, a haptic engine 60 electrically coupled to the transducer 100 will receive the current output by the transducer 100, and then vibrate at different speeds based on a magnitude of the current, thereby generating haptic feedbacks. As compared with traditional solutions, embodiments of the present disclosure not only provide haptic feedbacks of high accuracy to the user, but also convert the electric energy generated by the transducer 100 into the mechanical energy for use by the haptic engine 60, thereby reducing the power consumption and improving the user experience.

Optionally, in a specific embodiment of the above method, the step of generating by the haptic engine 60 haptic feedbacks based on a magnitude of the current upon receipt of the current output by the transducer 100 can comprise the sub-step of: comparing by the haptic engine 60 the amplitude of the received current with a preset current value, and generating corresponding haptic feedbacks by the haptic engine 60 if the amplitude of the received current is greater than or equal to the preset current value.

The magnitude of the preset current value can be set upon actual situations.

In the embodiments of the present disclosure, the transducer 100 may deform under the influence of external environmental factors, and output a current, finally causing the haptic engine 60 to generate haptic feedbacks. In this case, the deformations caused by the external environmental factors are often quite small. Therefore, a preset current value can be set such that the haptic engine 60 will not vibrate within a certain current range, which avoids adverse influences by the environmental factors.

The above description is only specific embodiments of the present disclosure, but the protection scope of the present disclosure is not limited thereto. Any variation or substitution easily conceivable within the technical scope disclosed in the present disclosure for a skilled person who is familiar with this technical field shall fall within the protection scope of the present disclosure. Therefore, the protection scope of the present disclosure shall be subject to the protection scope of the appended claims.

The invention claimed is:

1. A display device comprising:
    a display assembly, the display assembly comprising a display face and a non-display face opposite to the display face;
    a transducer; and
    a haptic engine, wherein
    the transducer is located on the non-display face of the display assembly, and configured to output a current with corresponding amplitude according to its own deformation, and
    the haptic engine is electrically coupled to the transducer, and configured to generate different degrees of haptic feedbacks based on the amplitude of the current output by the transducer, wherein
    the transducer comprises a plurality of sub-transducers insulated from each other, and
    the plurality of sub-transducers are in a same plane parallel to the display face;
    each sub-transducer comprises: a first piezoelectric film layer, a first electrode located on a side of the first piezoelectric film layer adjacent to the display assembly, and a second electrode located on a side of the first piezoelectric film layer remote from the display assembly, and
    the haptic engine comprises a plurality of sub-haptic engines corresponding to the plurality of sub-transducers respectively; and
    the first electrode of the each sub-transducer is electrically coupled to a corresponding haptic engine via a third conductive wire, and the second electrode of the each sub-transducer is electrically coupled to a corresponding haptic engine via a fourth conductive wire.

2. The display device according to claim 1, wherein the plurality of sub-transducers are arranged in an array.

3. The display device according to claim 2, wherein the display assembly comprises a display panel and a touch structure integrated in the display panel.

4. The display device according to claim 1, wherein an orthogonal projection of the transducer on the display face coincides with the display face,
    the transducer comprises a second piezoelectric film layer, a third electrode located on a side of the second piezoelectric film layer adjacent to the display assembly, and a fourth electrode located on a side of the second piezoelectric film layer remote from the display assembly, and
    the third electrode is electrically coupled to the haptic engine via a fifth conductive wire, and the fourth electrode is electrically coupled to the haptic engine via a sixth conductive wire.

5. The display device according to claim 4, wherein the display assembly comprises a display panel and a touch structure integrated in the display panel.

6. The display device according to claim 1, wherein the haptic engine comprises a motor and a control chip, and
    the control chip is configured to control the motor to generate a corresponding degree of haptic feedback based on the amplitude of the current output by the transducer.

7. The display device according to claim 6, wherein the display assembly comprises a display panel and a touch structure integrated in the display panel.

8. The display device according to claim 1, wherein the display assembly comprises a display panel and a touch structure integrated in the display panel.

9. A method for providing haptic feedbacks using the display device according to claim 1, comprising:
    outputting a current with a corresponding amplitude by the transducer according to its own deformation; and
    upon receipt of the current output by the transducer, generating by the haptic engine different degrees of haptic feedbacks based on the amplitude of the current.

10. The method according to claim 9, wherein the step of generating by the haptic engine different degrees of haptic feedbacks based on the amplitude of the current comprises:
    comparing by the haptic engine the amplitude of the received current with a preset current value, and generating the haptic feedbacks if the amplitude of the received current is greater than or equal to the preset current value.

* * * * *